June 3, 1969  E. T. KUMP  3,447,529

GAS TURBINE GALLEY

Filed May 11, 1967

United States Patent Office 3,447,529
Patented June 3, 1969

3,447,529
GAS TURBINE GALLEY
Edward T. Kump, deceased, late of Phoenix, Ariz., by Dorothy M. Kump, executrix, Phoenix, Ariz., assignor to The Garrett Corporation, Los Angeles, Calif., a corporation of California
Filed May 11, 1967, Ser. No. 637,852
Int. Cl. F24b *1/00;* F24c *3/00*
U.S. Cl. 126—19.5                                    9 Claims

ABSTRACT OF THE DISCLOSURE

A self-contained kitchen range structure having a gas turbine engine for supplying energy to heat foods, control cooking functions and operate appliances. The structure includes an electric generator driven by the engine; ducts leading from the engine exhaust to supply hot gases to heating regions such as ovens, griddles, serving trays, deep fry units, toaster, and coffee urn; electrically or pneumatically actuated gas control elements in such ducts; and a vent hood for collecting vapors from cooking foods, such vapors being ducted to the air inlet of the engine.

SUMMARY

This invention relates generally to apparatus for preparing food for consumption, and more particularly to a self-contained kitchen range structure which may be portable and suitable for use by the armed services, construction crews, railroads, personnel carriers, and similar units. The invention is directed to a structure having both exposed and enclosed cooking areas for frying, heating, toasting, baking, and other methods of preparing foods; and a gas turbine engine for supplying air under pressure, hot gases and electric current for heating and control purposes.

A primary object is to provide a range or galley structure which is self-contained so as to be mobile yet capable of all the functions required in food preparation. This object is achieved by forming a range structure with the cooking areas mentioned previously and a gas turbine engine for supplying hot gases and electric current, the structure having ducts leading from the engine exhaust to the cooking areas and control valves or dampers in the ducts, either pneumatically or electrically operated, to govern the flow of hot gases to the cooking areas.

The structure may also be provided with electrically powered heating units, if desired, as well as electrically driven supplementary appliances such as grinders, blenders, can openers, knife sharpeners, mixers, etc.

These and other objects will be made more apparent by the following description of one embodiment of the invention which has been illustrated in detail in the accompanying drawings.

DRAWINGS

DESCRIPTION

Figure 1:
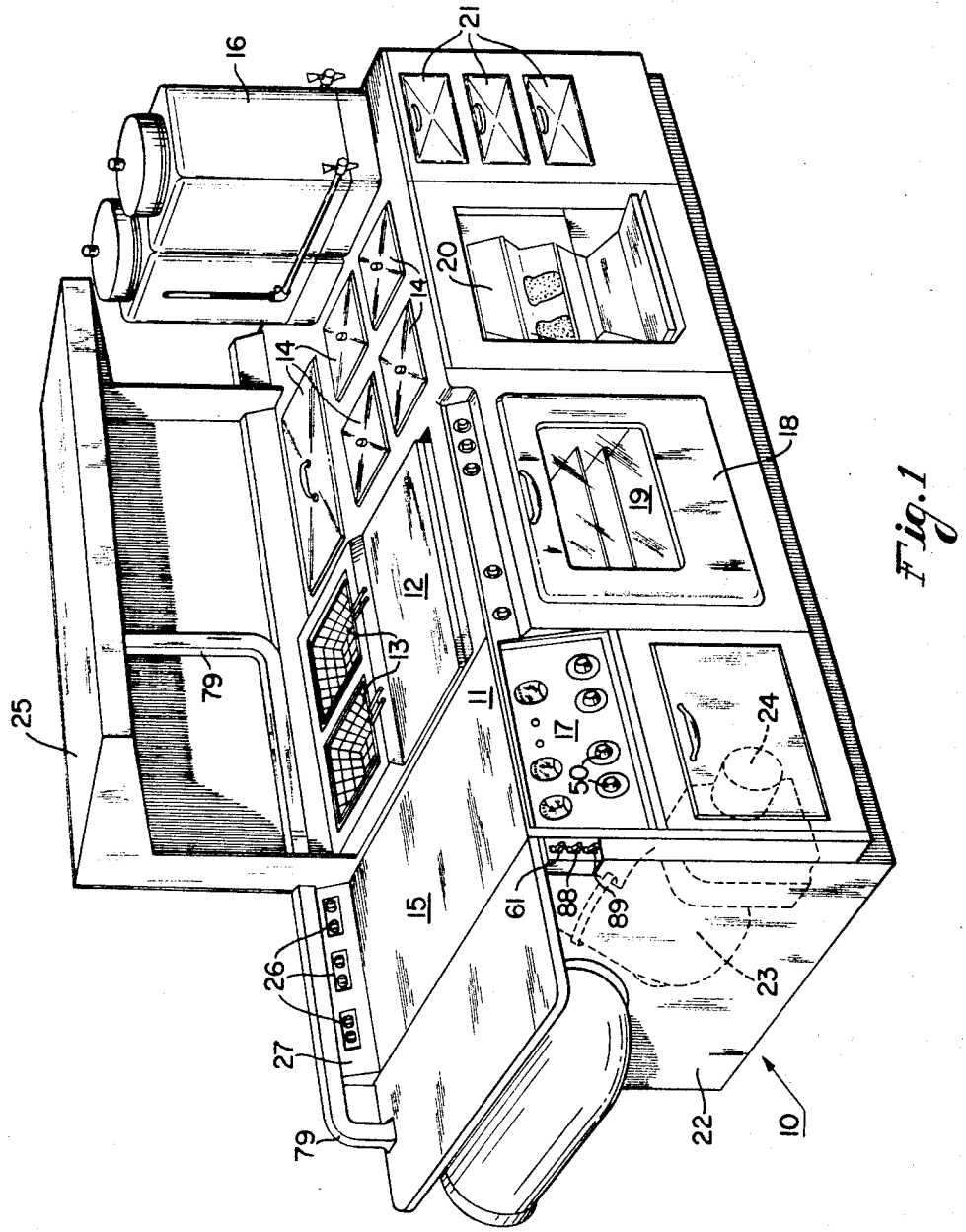
FIG. 1 is a perspective view of a range or galley structure formed in accordance with the present invention.

Particular reference to FIG. 1 of the drawing will show that the range or galley structure forming the subject matter of this invention includes a casing 10 formed of sheet metal or other suitable material to provide a cabinet-like structure. This structure has a plurality of food-heating or cooking devices in or on upper wall 11 thereof, some of these structures being designated as a griddle 12, deep fat fry wells 13, serving trays 14, and counter space 15. The top wall of the cabinet may also be provided with one or more coffee urns 16, and any other suitable elements.

The front wall of the cabinet includes a control panel 17, a door 18 to an enclosed cooking region or oven 19, a toaster 20, and warming ovens 21. The casing also provides a chamber 22 for receiving a gas turbine engine 23 and an electric generator 24 driven by the engine. The casing is provided near the rear portion of the cabinet with a back wall extending above the cabinet and provided at its upper end with a vent hood 25, this device projecting forwardly over a portion of the cooking areas at the top of the cabinet. Electric outlets 26 may be provided at suitable locations on the cabinet such as a panel 27 at the rear of the counter space 15.

Figure 2:
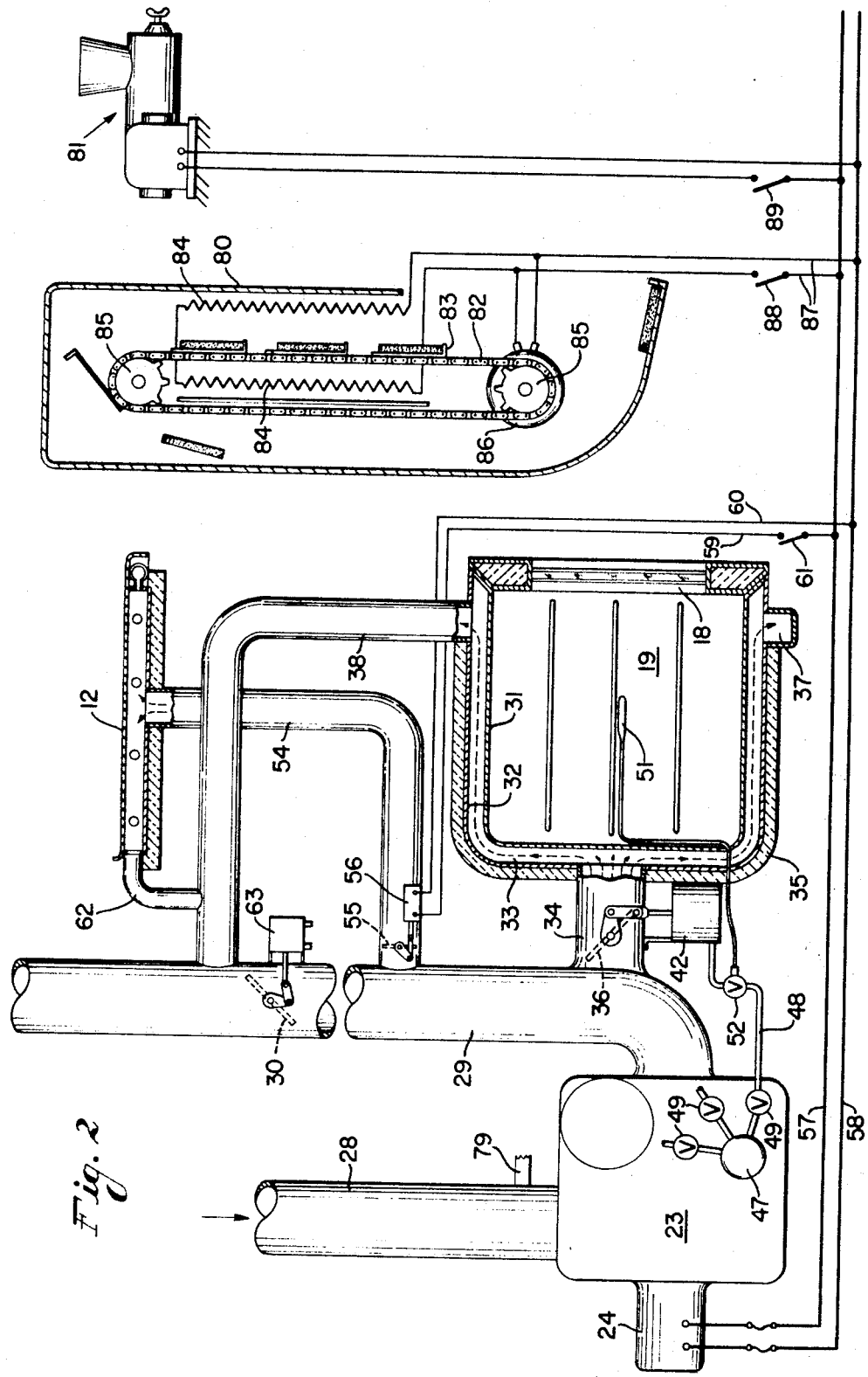
FIG. 2 is a schematic view showing different cooking areas and other devices provided in the structure shown in FIG. 1 together with various methods of applying energy, developed by means in the structure, to such areas and devices.

As pointed out previously, the cooking areas, either exposed or enclosed, are heated with energy provided by the gas turbine engine 23. In certain instances such cooking areas may be heated by hot gases exhausted from the gas turbine engine. In other instances the devices may be heated with resistance elements powered by electric current produced by the generator 24. In FIG. 2 such methods of accomplishing these objects have been illustrated.

In FIG. 2, which is a schematic view, the gas turbine engine is shown at 23. The generator 24 is disposed at one end of the gas turbine engine and driven thereby. An air inlet duct 28 leads to the gas turbine engine from a suitable region. The products of combustion flow from the engine after expansion in the turbine through an exhaust duct 29. This duct is provided with a damper 30, the purpose of which will be made more apparent hereinafter.

The oven, of which there may be one or more, is shown at 19. It includes an inner wall 31 surrounded by a second wall 32 spaced therefrom to provide a hot gas chamber 33, this chamber being connected by a short passage 34 with the exhaust duct 29. Suitable insulation 35 may be provided around the wall 32 to prevent loss of heat. The oven is provided at the front with the door 18. The passage 34 receives a valve element 36 for controlling the flow of heated exhaust gases from the duct 29 to the chamber 33. Suitable outlets from the chamber 33 permit the flow of hot gases to a manifold 37 at the forward end of the oven, this manifold being connected by a tube 38 with the duct 29 on the downstream side of the damper 30.

Figure 3:
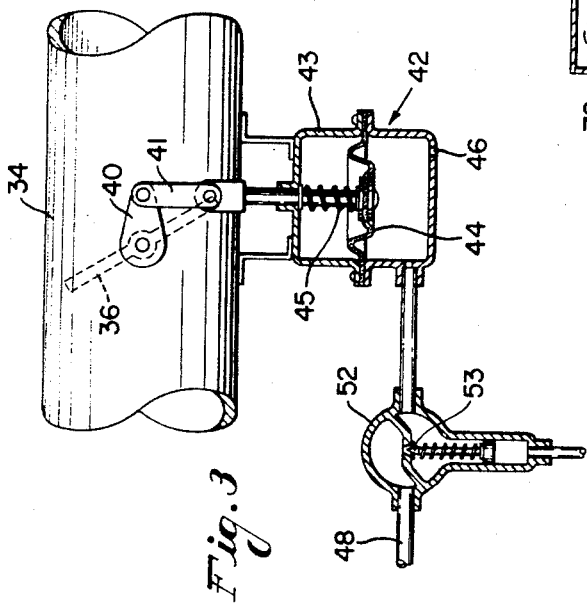
FIG. 3 is a detailed schematic view of a control device used in the range.

The valve 36, which has been illustrated in detail in FIG. 3, is connected by a crank arm 40 and link 41 with an actuator 42. Such actuator may be of any suitable type, the one shown being pneumatically operated and having a casing 43 divided into chambers by a diaphragm 44 which is peripherally clamped by parts of the casing 43. This diaphragm is urged in one direction by a spring 45 to move the valve 36 in a passage closing direction. Air under pressure supplied to the casing at the side of the diaphragm opposite the spring will move the diaphragm, and consequently the valve 36, in a passage opening direction. A bleed opening 46 permits the controlled escape of air from the casing.

Air under pressure may be taken from the compressed air section of the gas turbine engine. To permit this use of air, the engine has a bleed manifold 47 from which as many actuator and/or control lines 48 as are necessary may be fed. Each of these lines contains a valve 49 with an operating knob 50 therefor provided on the panel 17. One of the lines 48 is shown on FIG. 2 extending to the actuator 42 for the valve 36. When the valve 49 in this line is open, air under pressure will be permitted to flow from the compressor outlet to the actuator 42. This air under pressure will move the diaphragm 44 in opposition to the force of spring 45 to cause valve 36 to open and permit exhaust gas to flow to the chamber 33 to heat the oven 19. If desired, the oven may be provided with a thermostat 51 connected for operation with a second valve 52 in line 48 to control the flow of air through this line. When the oven is below a predetermined temperature, the valve 52 will be in open position, and air under pressure will flow to actuator 42 to hold valve 36 in an open position. As the temperature increases in the oven, a needle 53 in valve 52 will move to reduce the flow of air through line 48, thus permitting the pressure at the power side of the diaphragm 44 to fall, and spring 45 may then move valve 36 in a passage closing direction. It will be obvious that as long as the quantity of air flowing through the line 48 exceeds the capacity of the bleed opening 46, the force applied to diaphragm 44 will be sufficient to overcome spring 45. This force, however, may vary to adjust valve 36 and thus control the temperature of the oven 19.

In FIG. 2 an exposed cooking surface or griddle 12 is also illustrated. To effect the heating of this griddle, the reverse or bottom surface thereof is also exposed to exhaust gases. These gases are conducted to an enclosed space beneath the griddle 12 through a conduit 54 leading from the exhaust duct 29. The conduit 54 is also provided with a valve 55 for controlling the admission of exhaust gases to the space beneath the griddle 12. For purposes of illustration, valve 55 is shown as an electrically operated element, solenoid 56 being suitable connected with the valve 55 to effect operation thereof. Power for supplying the solenoid 56 is extracted from the generator 24, suitable leads 57 and 58 being extended from the generator. Wires 59 and 60 connect the leads 57 and 58 with the solenoid 56. This connection depends, obviously, upon the actuation of a switch 61 arranged in wire 59. Solenoid 56 may be spring-pressed to close valve 55 when switch 61 is moved to an open position. The chamber beneath the griddle 12 is connected by a tube 62 with tube 38 to permit the flow of spent gases to the duct 29.

Figure 4:
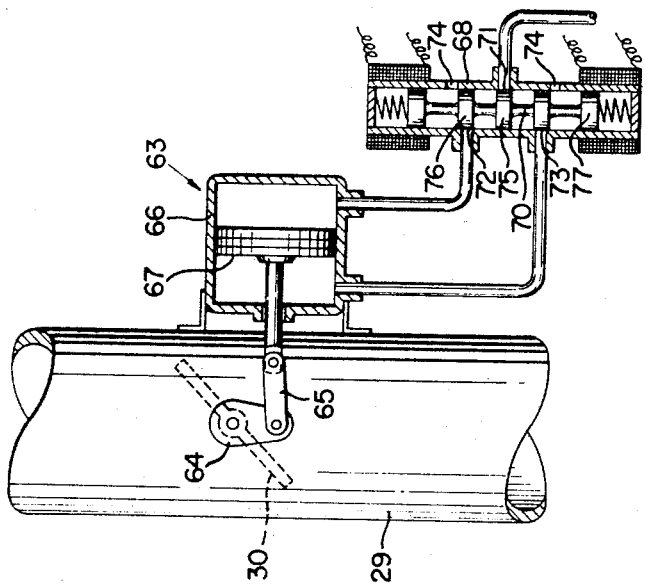
FIG. 4 is a similar view of another control mechanism employed.

It will be necessary, when it is desired to effect the operation of any of the cooking areas or regions, to cause the exhaust gases to flow to the gas spaces associated with the selected cooking areas and heat such areas or regions. To effect this flow, the damper 30 may be moved toward a closed position in the duct 29. This movement is effected by an actuator 63 connected with the damper 30 by a lever 64 and link 65. The actuator 63, in the form illustrated in FIG. 4, includes a cylinder 66 and piston 67. This piston divides the cylinder into pressure chambers for receiving air or other fluid under pressure to effect the operation of the actuator 63. The admission of fluid to this actuator may be controlled by a valve mechanism 68 of the type constructed to cause the actuator to proportionally adjust the position of the damper 30. The valve 68 illustrated includes a body containing a spool 70 and having an inlet 71, a pair of actuator fluid outlets 72 and 73, and exhaust ports 74. The outlets 72 and 73 are disposed at either side of inlet 68, while the exhaust ports are located beyond the ports 72 and 73.

The spool 70 has spaced piston portions 75, 76 and 77. The piston portions provide grooves which may alternately connect the inlet port 71 with ports 72 and 73. The spool is further provided with end piston portions which co-operate with portions 76 and 77 to provide grooves to connect either port 72 or 73 with an outlet port when the other is connected with the inlet port. When port 72 is connected with the inlet port, fluid will be admitted to the cylinder 63 to move piston 67 in a direction to cause damper 30 to move toward a closed position. When port 73 is connected with the inlet port, the piston will move in the opposite direction and cause damper 30 to open.

The valve 68 is an electroresponsive valve having electrical coils at the ends to effect the movement of the spool. The direction of movement of the spool will determine the direction of movement of the damper. The degree of movement of the damper will be determined by the length of time the inlet port is connected with either actuator port.

Suitable switch means may be provided in connection with knobs 50 of the control valves so that the damper will be actuated when any of the valves 49 are opened or closed to admit or interrupt the flow of exhaust gases to cooking areas. By moving damper 30 toward closed position, the pressure of the exhaust gases at the upstream side of the damper will be increased to cause these exhaust gases to flow to the chambers around the cooking areas. When no valve 49 is opened, damper 30 will be in a fully open position to permit unobstructed flow of exhaust gases from the gas turbine.

Figure 5:
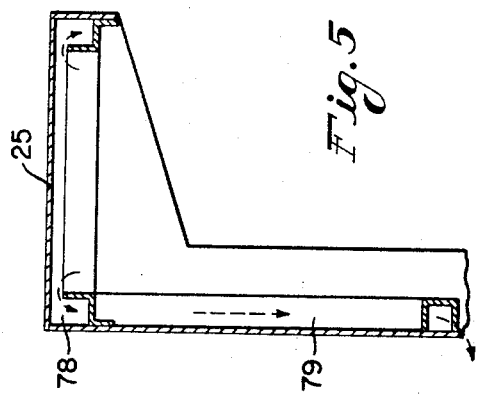
FIG. 5 is a detailed sectional view showing a vent hood provided over the surface cooking areas of the range shown in FIG. 1.

FIG. 5 shows a suitable construction of a vent hood 25. This hood projects over the cooking areas and is provided with a manifold 78 around the edge portion, this manifold opening to the interior of the hood. A passage 79 leads from the manifold to the inlet of the gas turbine so that when the turbine is in operation, a vacuum will be produced within the hood 25 whereby food vapors will be collected and conducted to the inlet of the gas turbine. If desired, an electric motor driven fan could be provided to exhaust the vapors from the vent hood.

Any desired accessories, such as a toaster 80 or food grinder 81, may be operated by electric current produced by the generator 24. The toaster 80 has been illustrated in FIG. 2 as a continuously operated device having endless chains 82 provided with sliced bread holders 83 arranged for movement between a plurality of heating elements 84. The chains 82 are trained around sprockets 85, one set of which may be driven by motor 86 to effect the movement of the chains. Wires 87 conduct current from leads 57 and 58 to the resistance elements 84 and motor 86. Flow of current is governed by switch 88. A switch 89 may be employed to control current flow to the food grinder.

Any other electrically operated attachments, such as blenders, juicers, knife sharpeners, etc., and their necessary connections and controls, could be provided.

I claim:
1. A kitchen range structure comprising:
   (a) a casing forming exposed surface cooking areas and enclosed cooking regions;
   (b) a gas turbine engine carried by said casing;
   (c) a duct leading from said gas turbine engine to conduct exhaust gases therefrom to a point of discharge;
   (d) means in said duct for controlling the flow of exhaust gases therethrough;
   (e) a branch duct leading from said exhaust duct upstream of said flow controlling means to at least one of said cooking areas and regions; and
   (f) a selectively operated gas flow control means in said branch duct.

2. The kitchen range structure of claim 1 in which the selectively operated gas flow control means is electroresponsive.

3. The kitchen range structure of claim 2 in which the selectively operated gas flow control means is thermoresponsive to maintain the cooking area at a predetermined temperature.

4. The kitchen range structure of claim 2 in which the selectively operated gas flow control means is pneumatically operated.

5. The kitchen range structure of claim 2 in which the selectively operated gas flow control means is operated by power generated by the gas turbine engine.

6. The kitchen range structure of claim 1 in which the casing has a hood over the exposed surface cooking areas and a duct extends from said hood to the air inlet of the gas turbine engine to remove vapors arising from foods on said surface cooking areas.

7. The kitchen range structure of claim 1 in which means are provided to effect a controlled closing of the flow controlling means in the exhaust duct when a flow control means in a branch duct is opened.

8. The kitchen range structure of claim 7 in which the means for effecting the controlled closing of the exhaust duct flow controlling means is of the electroresponsive type.

9. The kitchen range structure of claim 7 in which the means for effecting the controlled closing of the exhaust duct flow controlling means includes a pneumatic actuator and an electroresponsive valve for controlling the application of pneumatic fluid thereto.

References Cited

UNITED STATES PATENTS

| | | | |
|---|---|---|---|
| 1,527,217 | 2/1925 | Poe. | |
| 2,533,881 | 12/1950 | Duff | 126—19.5 |
| 2,970,589 | 2/1961 | Cushman | 126—19.5 |
| 3,169,871 | 2/1965 | Macchi et al. | 126—39 X |

CHARLES J. MYHRE, *Primary Examiner.*

U.S. Cl. X.R.

126—39